Dec. 5, 1967  F. M. WANLASS  3,356,858
LOW STAND-BY POWER COMPLEMENTARY FIELD EFFECT CIRCUITRY
Filed June 18, 1963  5 Sheets-Sheet 1
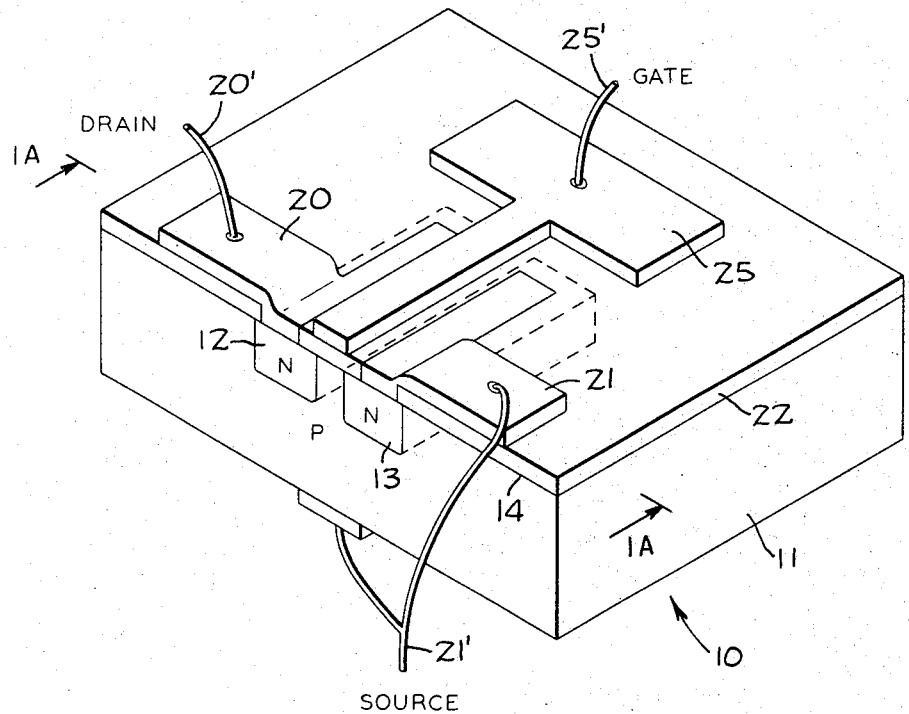
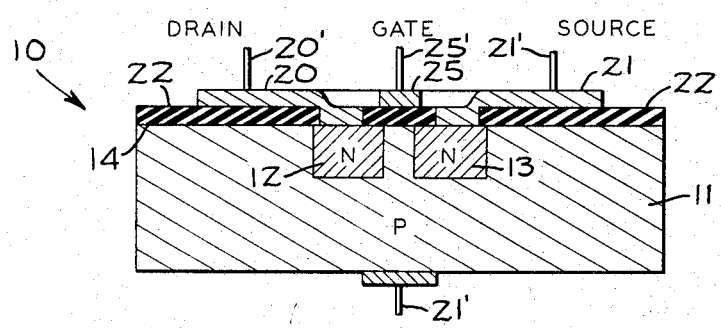
INVENTOR.
FRANK M. WANLASS
BY
Lippincott, Ralls & Henderson
ATTORNEYS Dec. 5, 1967  F. M. WANLASS  3,356,858
LOW STAND-BY POWER COMPLEMENTARY FIELD EFFECT CIRCUITRY
Filed June 18, 1963  5 Sheets-Sheet 2
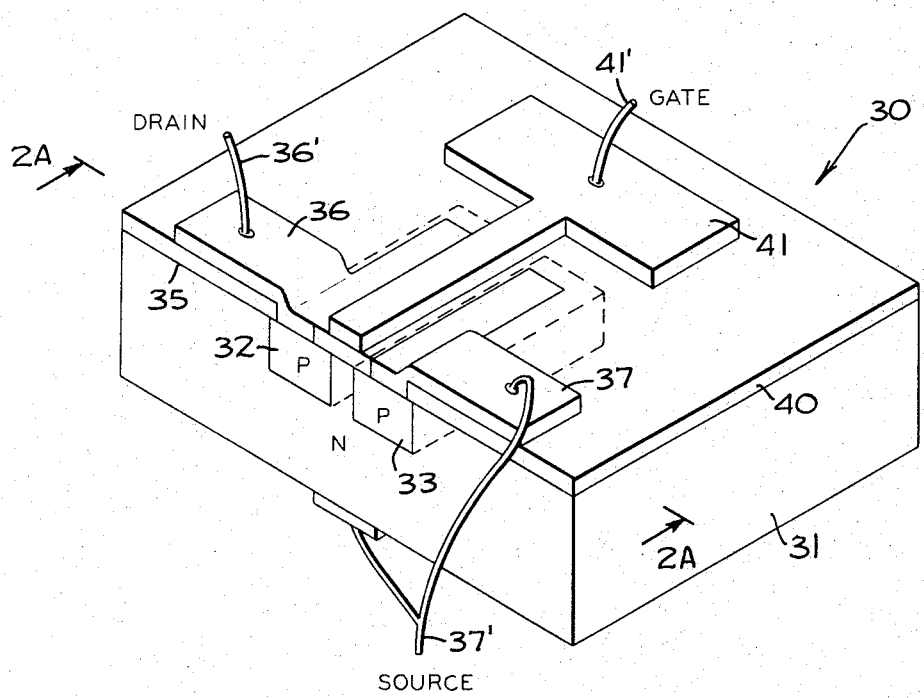
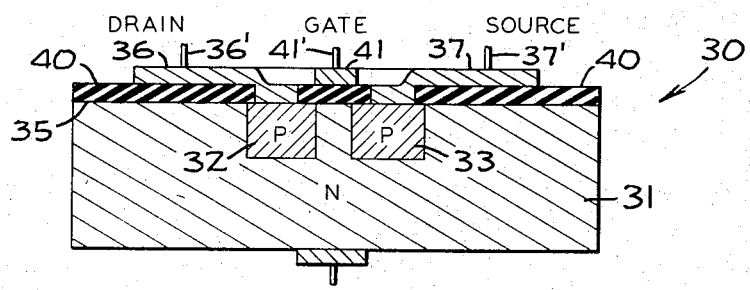
INVENTOR.
FRANK M. WANLASS
BY
*Lippincott, Ralls & Hendricson*
ATTORNEYS Dec. 5, 1967  F. M. WANLASS  3,356,858
LOW STAND-BY POWER COMPLEMENTARY FIELD EFFECT CIRCUITRY
Filed June 18, 1963  5 Sheets-Sheet 3

INVENTOR.
FRANK M. WANLASS
BY
Lippincott, Ralls & Hendricson
ATTORNEYS

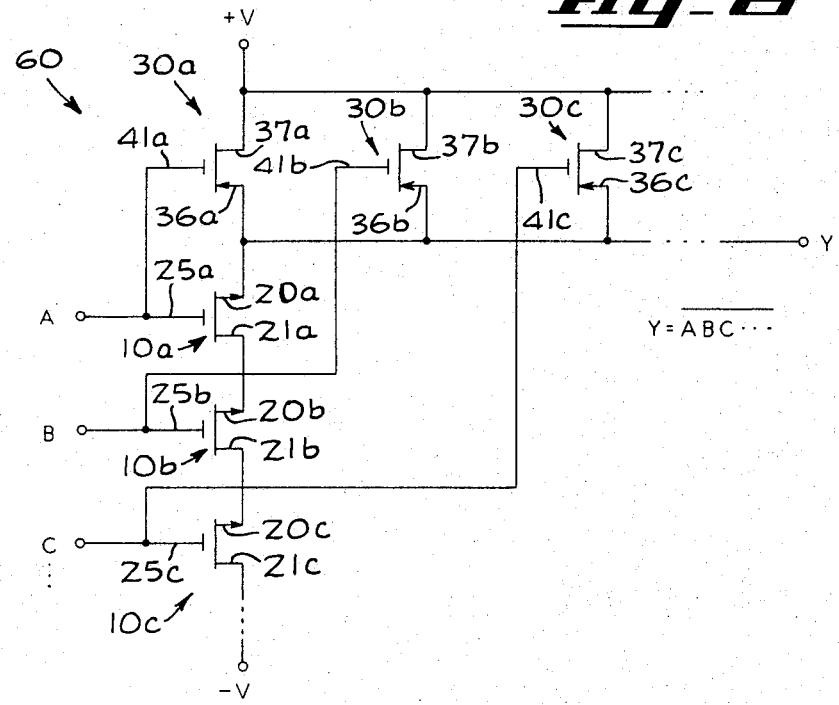
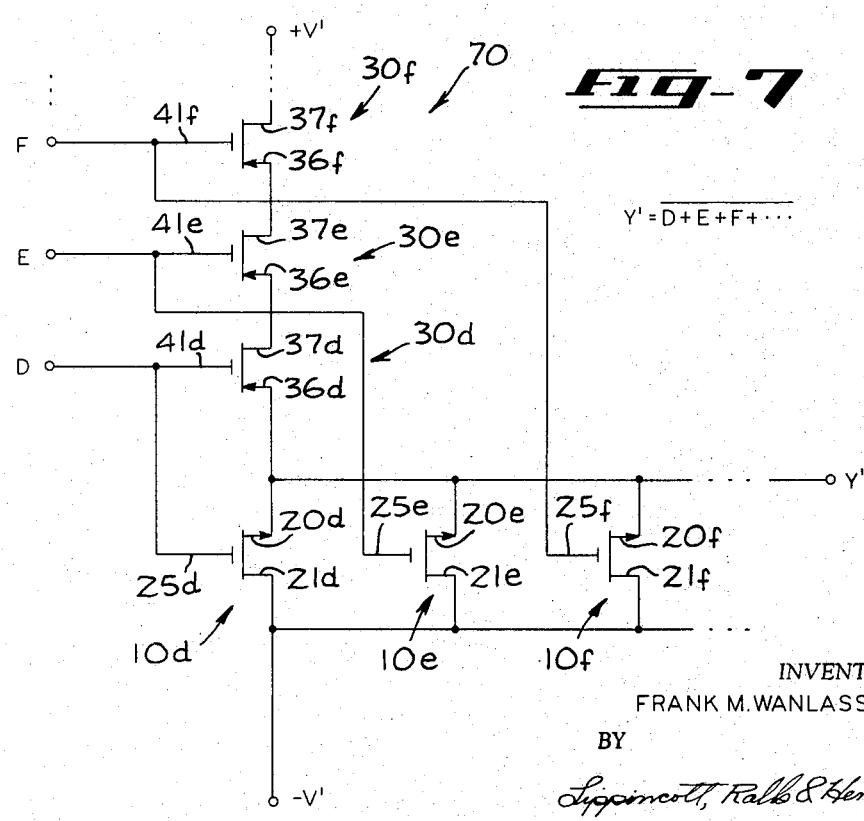

Dec. 5, 1967  F. M. WANLASS  3,356,858
LOW STAND-BY POWER COMPLEMENTARY FIELD EFFECT CIRCUITRY
Filed June 18, 1963  5 Sheets-Sheet 5
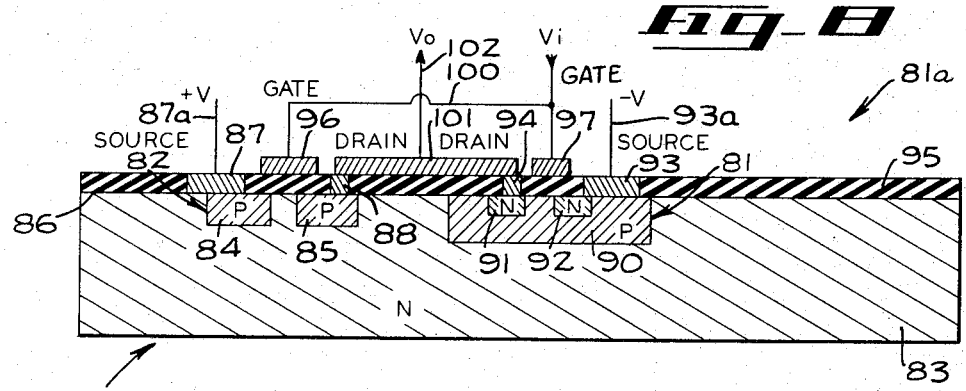
Fig_8
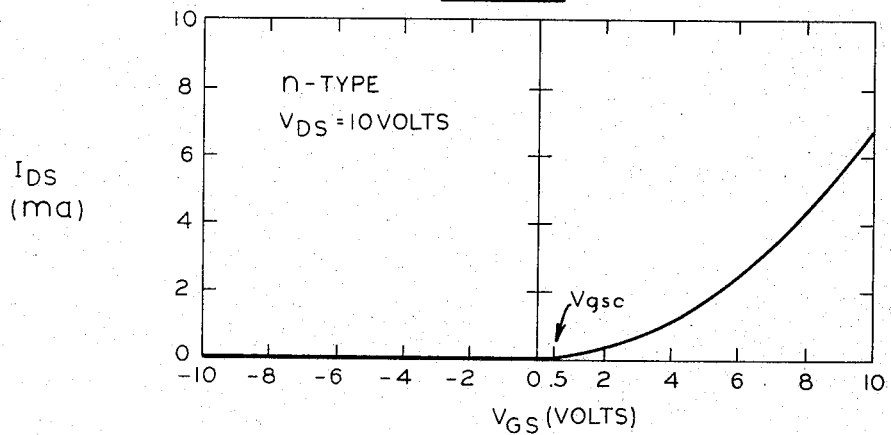
Fig_9
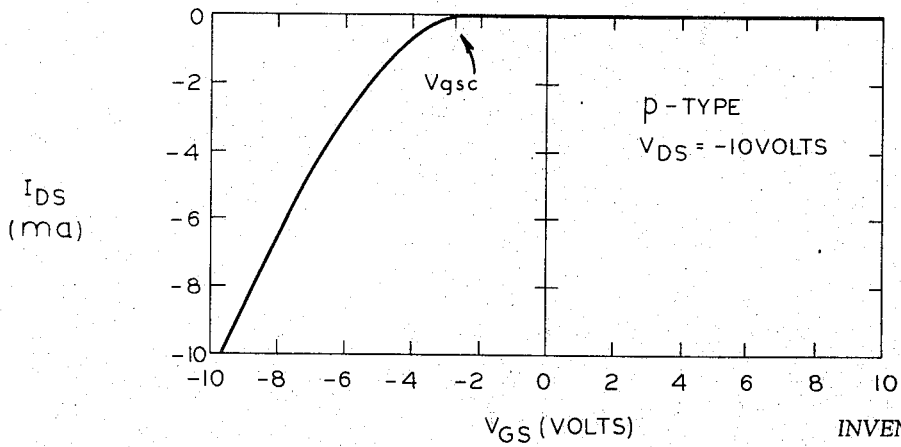
Fig_10
INVENTOR.
FRANK M. WANLASS
BY
Lippincott, Ralls & Hendricson
ATTORNEYS United States Patent Office 3,356,858
Patented Dec. 5, 1967

3,356,858
LOW STAND-BY POWER COMPLEMENTARY
FIELD EFFECT CIRCUITRY
Frank M. Wanlass, Mountain View, Calif., assignor to Fairchild Camera and Instrument Corporation, Syosset, N.Y., a corporation of Delaware
Filed June 18, 1963, Ser. No. 288,786
3 Claims. (307—88.5)

ABSTRACT OF THE DISCLOSURE

A combinatorial switching circuit using a pair of complementary insulated field-effect transistors, each having one of its source or drain electrodes connected to the source or drain electrode of the other; a signal of a single predetermined, single polarity voltage is applied to both gates of both devices to obtain the necessary switching operation.

---

The present invention relates in general to transistor circuits, and more particularly to a circuit employing field-effect semiconductor devices.

Heretofore, logic networks or circuits required passive load elements, such as a resistor or some other passive load component. By employing a passive load element, such as a load resistor, in the logic circuit, power was dissipated during the stand-by period or during the time intervals in which no switching operation was occurring.

Accordingly, an object of the present invention is to provide circuits in which power losses are minimized.

Another object of the present invention is to provide logic circuits in which power dissipation is reduced during stand-by periods.

Another object of the present invention is to provide a transistor circuit employing field-effect semiconductor devices wherein a field-effect semiconductor device of one carrier type is used as the active load for the field-effect semiconductor device of the opposite carrier type.

Another object of the present invention is to provide a transistor circuit in which an inverter action is produced without employing any passive load element.

Another object of the present invention is to provide a transistor circuit in which a switching action is created at a faster rate while reducing the stand-by power normally consumed by the passive load resistance.

Another object of the present invention is to provide improved integrated microcircuits.

Another object of the present invention is to provide switching circuits wherein leakage current is reduced.

Another object of the present invention is to provide logic circuits adapted for improved fan out.

Another object of the present invention is to provide logic circuits with improved tolerance for high temperature differentials between different circuit elements.

Another object of the present invention is to provide integrated logic circuits adapted for efficient cooling with a reduced amount of heat exchange area.

Another object of the present invention is to provide micrologic circuits with a low stand-by power density and a high switching power density, whereby a high packing density is obtained.

Other and further objects and advantages of the present invention will be apparent to one skilled in the art from the following description taken in conjunction with the accompanying drawings, in which:

FIG. 1 is an enlarged schematic perspective view of an N-type insulated gate field-effect semiconductor device employed in the present invention.

FIG. 1A is a vertical sectional view of the N-type insulated gate field-effect semiconductor device taken along line 1A—1A of FIG. 1.

FIG. 2 is an enlarged schematic perspective view of a P-type insulated gate field-effect semiconductor device employed in the present invention.

FIG. 2A is a vertical sectional view of the P-type insulated gate field-effect semiconductor device taken along line 2A—2A of FIG. 2.

FIG. 6 is a schematic diagram of a NAND logic circuit using the insulated gate field-effect semiconductor devices shown in FIGS. 1 and 2.

FIG. 7 is a schematic diagram of a NOR logic circuit employing the insulated gate field-effect semiconductor devices shown in FIGS. 1 and 2.

FIG. 8 is an enlarged schematic cross sectional view of the insulated field-effect semiconductor device shown in FIGS. 1 and 2 integrated into a single semiconductor chip or slice.

FIG. 9 is a graph illustrating the drain current as a function of the gate voltage for a typical device shown in FIGS. 1 and 1A.

FIG. 10 is a graph illustrating the drain current as a function of the gate voltage for a typical device shown in FIGS. 2 and 2A.

Figure 3:
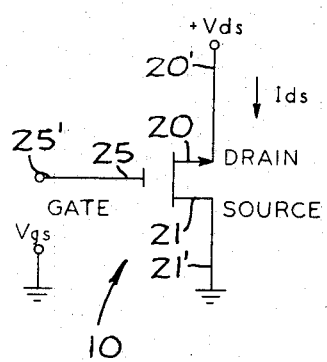
FIG. 3 is a schematic circuit diagram of the N-type insulated gate field-effect semiconductor device shown in FIG. 1 with the biasing potential applied thereto.

Illustrated in FIGS. 1 and 1A is an N-type external insulated gate field-effect semiconductor device 10 employed in the present invention, which comprises a substrate or body 11 of semiconductor material, such as silicon. The silicon body 11 is doped in a conventional manner with P-type impurities, such as aluminum, gallium, boron or indium. Also formed in the silicon body or wafer 11 are N-type diffused regions 12 and 13, which extend to an upper surface 14 of the P-type silicon wafer 11. The N-type diffused regions 12 and 13 are formed in a conventional manner by diffusing antimony, arsenic or phosphorus into the silicon body 11.

An insulated layer 22 preferably of silicon dioxide is thermally grown on the surface 14 of the silicon body 11 and is located in part between the drain contact 20 and the source contact 21. The drain contact 20 and the source contact 21 are formed by evaporation of a suitable metallic substance, such as aluminum; a metallic gate 25 of preferably aluminum is disposed in contact with the portion of the insulated layer 22 located between the drain contact 20 and the source contact 21, such that the metal overlaps the inside edges of diffused regions 12 and 13. Lead 20′ is attached to the drain contact 20 and a lead 25′ is attached to the gate 25. The source electrode 21 has a lead 21′ attached thereto and connected to the substrate 11.

In FIGS. 2 and 2A is illustrated a P-type externally insulated gate field-effect semiconductor device 30 which is also employed in the present invention. The P-type insulated field-effect semiconductor device 30 includes a body or wafer 31 made of suitable semiconductor material, such as silicon. The silicon body or substrate 31 is doped in a conventional manner with N-type impurities, such as antimony, arsenic or phosphorous. Also formed in the silicon body 31 are P-type diffused regions 32 and 33, which extend to an upper surface 35 of the N-type silicon wafer 31. The P-type diffused regions 32 and 33 are formed in a conventional manner by diffusing a P-type impurity, such as boron or indium into the silicon body 11. An insulated layer 40 preferably of silicon dioxide is thermally grown on the surface 35 of the silicon body 31 and is located in part between the drain contact 36 and the source contact 37. A suitable metallic substance, such as aluminum, is then evaporated or otherwise deposited to form the drain contact 36 and the source contact 37. A metal gate 41 of preferably aluminum is disposed in contact with the portion of the insulated layer 40 located between the drain contact 36 and the source contact 37, such that the metal overlaps the inside edges of the diffused regions 32 and 33. Lead 36′ is attached to the drain contact 36 and a lead 41′ is attached to the gate 41. The source electrode 21 has a lead 21′ attached thereto and connected to the substrate 31.

In practice, the external insulated gate field-effect semiconductor devices 10 and 30 are produced with relative facility and ease of operation. After the silicon substrate or wafer is prepared, it is oxidized by exposure to an oxygen-containing atmosphere at temperatures in the order of 1200 degrees centigrade. Thereupon, an array of holes is formed in the oxide by photolithographic techniques. Since the remaining oxide film acts as a barrier against the penetration of most donor and acceptor impurities, the contact areas can be diffused selectively into the holes which have been prepared in the oxide.

A second photoengraving operation is required to reopen the holes over the diffused regions for electrical contacts, since during the diffusion cycle, oxide is ordinarily regrown. The metal contacts for the source, gate and drain can be applied simultaneously by evaporating a metal film, usually aluminum, over the entire surface and removing the unwanted portions by a third photoengraving operation. The source is electrically connected to the substrate during the preparation of the device structure.

As shown in FIG. 3, the N-type external insulated gate field-effect semiconductor device 10, which is a majority carrier device by electron conduction, has a positive biasing potential $V_{ds}$ applied between the drain 20 and the source 21 with the drain 20 at a positive voltage and with the source 21 at ground. When current flows in the semiconductor device 10, it flows from the drain 20 to the source 21 through a path disposed therebetween adjacent the insulated layer 22 and parallel with the upper surface 14 of the silicon body 11. The path for the current $I_{ds}$ includes the N-diffused regions 12 and 13 with the portion of the P-type silicon body 11 therebetween. The flow of current $I_{ds}$ from the drain 20 to the source 21 is controlled by the potential applied to the gate 25 with respect to the source 21, which is at ground. In order for current $I_{ds}$ to flow or the device 10 to be rendered conductive, the applied potential $V_{gs}$ between the gate 25 and the source 21 must be equal to or greater in magnitude than a critical positive potential $V_{gsc}$ (see FIG. 9). When the voltage $V_{gs}$ falls below the critical positive potential, no current will flow from the drain 20 to the source 21 and the device 10 is rendered non-conductive. The critical potential $V_{gsc}$ required before the device 10 first starts to conduct can be regulated by varying the thickness of the insulated layer 22.

Figure 4:
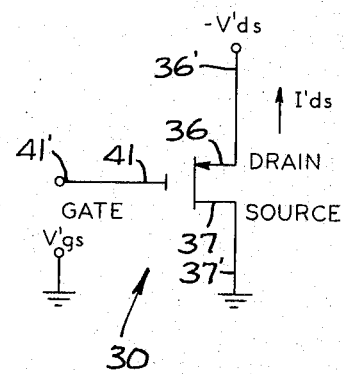
FIG. 4 is a schematic circuit diagram of the P-type insulated gate field-effect semiconductor device shown in FIG. 2 with the biasing potential applied thereto.

The P-type insulated gate field-effect semiconductor device 30 (FIG. 4), which is a majority carrier device by hole conduction, has a negative biasing potential $V'_{ds}$ applied between the drain 36 and the source 37 with the drain 36 at a negative voltage and with the source 37 at ground. When current flows in the semiconductor device 30, it flows from the source 37 to the drain 36 through a path disposed therebetween adjacent the insulated layer 40 and parallel with the upper surface 35 of the silicon body 31. The path or channel for the current $I'_{ds}$ includes the P-diffused regions 32 and 33 with the portion of the N-type silicon body 31 therebetween. The flow of current $I'_{ds}$ from the source 37 to the drain 36 is controlled by the potential applied to the gate 41 with respect to the source 37, which is at ground. In order for current $I'_{ds}$ to flow or the device 30 to be rendered conductive, the applied potential $V'_{gs}$ between the gate 41 and the source 37 must be equal to or more negative in magnitude than a critical negative potential $V_{gsc}$ (see FIG. 10). When the voltage $V_{gs}$ is less negative than the critical negative potential, no current will flow from the source 37 to the drain 36 and the device 31 is rendered non-conductive. The negative potential $V'_{gsc}$ required before the device 30 first starts to conduct can be regulated by varying the thickness of the insulated layer 40.

When an electric field is applied to the surface of an insulated field-effect semiconductor device, the mobile charge carriers within the semiconductor device are attracted to or repelled from the surface. In the event the field so applied is of adeqaute magnitude and of proper polarity, the resulting accumulation of carriers near the surface can result in the formation of an inversion layer or channel in which the majority carrier near the surface is of opposite type from that in the remainder of the semiconductor body.

By applying to the gate 25 of the N-type field-effect semiconductor device 10 (FIGS. 1, 1A and 3) a positive potential relative to the substrate 11 equal to or greater than the critical magnitude, an N-type inversion layer or channel now connects the N-diffused regions 12 and 13 for imparting a source-to-drain conductance thereto. In the complementary P-type field-effect semiconductor device 30 (FIGS. 2, 2A and 4), a negative potential is applied to the gate 41 of the critical magnitude to form a P-type inversion layer or channel between the P-diffused regions 32 and 33 to impart a drain-to-source conductance thereto. The transistor region between the inversion layer and the substrate functions like a P-N junction and remains reverse biased at all times. When the potential applied to a gate is less than the critical value, the impedance between the source and the drain is very high and corresponding to a reverse biased planar silicon diode.

The voltage applied to the drain of the field-effect semiconductor devices is of a polarity to reverse bias the diffused junction at the drain contact. Hence, a positive voltage is applied to the drain contact for diffused N-regions and a negative voltage is applied to the drain contact for diffused P-regions.

Figure 5:
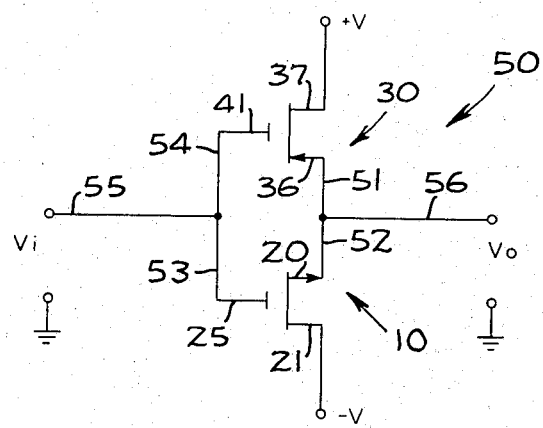
FIG. 5 is a schematic diagram of an inverter circuit employing the insulated gate field-effect semiconductor devices illustrated in FIGS. 1 and 2.

According to the present invention, an inverter circuit 50 (FIG. 5) employs the P-type insulated gate field-effect semiconductor device 30 and the complementary N-type insulated gate field-effect semiconductor device 10 to effect a switching operation without employing any passive components, such as a load resistor or some other passive load element. By connecting the sources 36 and 20 of the semiconductor devices 30 and 10, respectively, in common over conductors 51 and 52 and by connecting the gates 41 and 25 of the semiconductor devices 30 and 10, respectively, in common over conductors 53 and 54, the field-effect semiconductor device 30, a majority hole carrier device, is used as the active load for the field-effect semiconductor device 10, a majority electron carrier device. The converse is also true, since the field-effect semiconductor device 10, a majority electron carrier device, is used as the active load for the field-effect semiconductor device 30, a majority hole carrier device.

Figure 5A:
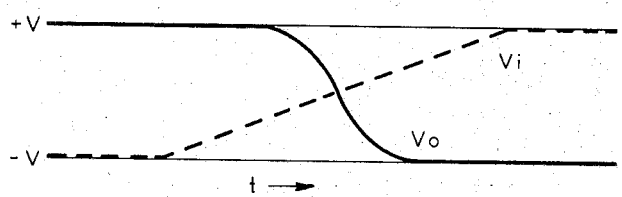
FIGS. 5A and 5B are graphs illustrating input-output characteristics for the inverter circuit shown in FIG. 5.
Figure 5B:
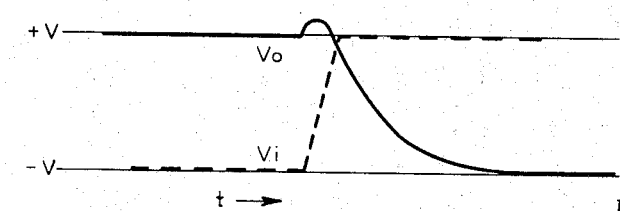

In the operation of the inverter circuit 50, an input signal $V_i$ (FIGS. 5, 5A and 5B) is impressed on the gates 25 and 41 of the semiconductor devices 10 and 30, respectively, through conductors 53–55. An output signal Vo is taken from the drains 20 and 36 of the semiconductor devices 10 and 30, respectively, over conductors 56, 52 and 51.

When the input signal Vi which is impressed on the gates 25 and 41, is greater than the positive critical potential, the P-type field-effect semiconductor device 30 will not conduct and the N-type field-effect semiconductor device 10 will conduct making the output voltage Vo negative. See FIGS. 5A and 5B to show the output voltage Vo for a slowly charging input signal and for a rapidly rising pulse. When the input signal Vi, which is impressed on the gates 25 and 41, is more negative than the negative critical potential, the N-type field-effect semiconductor device 10 will not conduct and the P-type field-effect semiconductor device 30 will conduct making the output voltage Vo positive.

Accordingly, the circuit 50 produces a switching or inverting action without employing any passive load component, such as a load resistor. Further, it is to be observed from the inverter circuit 50 that only one of the semiconductor devices 10 and 30 will conduct if the input voltage Vi is above a predetermined positive value or below a predetermined negative value. Therefore, if the total supply voltage difference 2V is great enough so that when Vi goes from −V to +V, device 10 will turn on and device 30 will turn off, then power is dissipated only during the switching operation and not during any stand-by condition. Hence, a low-power system is achieved. In actual practice the power consumed during a stand-by operation is less than 10 nanowatts per node and, yet, the inverter circuit 50 can effect switching in less than 20 nanoseconds. Moreover, the conducting field-effect semiconductor device will be turned on to a low resistance state, while the the non-conducting field-effect semiconductor device is turned off to an extremely high resistance state, so that output circuit capacities can be rapidly charged during switching. From the foregoing, it is to be observed that the usual requirement of more stand-by power for rapid switching is avoided, since stand-by power is not dissipated in any passive load resistor or component.

In FIG. 6 is illustrated a NAND logic or gate circuit 60 employing the complementary N and P type insulated field-effect semiconductor devices 10 and 30. A plurality of P-type insulated field-effect semiconductor devices, such as 30a, 30b and 30c, are connected in parallel. Impressed on the source electrodes 37a, 37b and 37c of the semiconductor devices 30a–30c, respectively, is a biasing potential +V. The output of the logic circuit is taken at the drain electrodes 36a–36c of the semiconductor devices 30a–30c, respectively.

Connected in series with the parallel P-type insulated field-effect semiconductor devices 30a–30c are N-type insulated field-effect semiconductor devices 10a–10c. Applied to the source contact 21c of the semiconductor device 10c is a biasing potential −V. The P-type field-effect semiconductor device 30a and the N-type field effect semiconductor device 10a are complementary. Further, the P-type field-effect semiconductor device 30b and the N-type field-effect semiconductor device 10b are complementary. Similarly, the P-type field-effect semiconductor device 30c and the N-type field-effect semiconductor device 10c are complementary.

In the operation of the NAND logic circuit 60, an input signal of +V or −V is impressed on the gates 25a and 41a of the complementary semiconductor devices 10a and 30a. In a similar manner, an input signal B is fed to the gates 25b and 41b of the complementary semiconductor devices 10b and 30b. Likewise, an input signal C is transmitted to the gates of the complementary semiconductor devices 10c and 30c. The input signals A, B and C are transmitted simultaneously to the field-effect semiconductor devices in the manner above indicated.

Should all signals A, B and C be at +V so that their associated P-type field-effect semiconductor devices are not conductive and their associated N-type devices are conductive, then there will be a negative output voltage at Y. When the semiconductor devices 30a–30c conduct, the complementary semiconductor devices 10a–10c, respectively, provide a high impedance and the active load.

A NOR logic or gate circuit 70 is shown in FIG. 7, which employs the complementary N and P type insulated field-effect semiconductor devices 10 and 30. A plurality of N-type insulated field-effect semiconductor devices, such as 10d–10f, are connected in parallel. Impressed on the source electrodes 21d–21f of the semiconductor devices 10d–10f is a biasing potential −V. Connected in series with the semiconductor devices 10d–10f are parallel connected P-type insulated field-effect semiconductor devices 30d–30f. Applied to the source electrode 37f of the semiconductor device 30f is a biasing potential V'. The output of the logic circuit 70 is taken at Y' at the drain electrodes 20d–20f of the semiconductor devices 10d–10f.

The N-type field-effect semiconductor device 10d and the P-type field-effect semiconductor device 30d are complementary. Likewise, the N-type field-effect semiconductor device 10e and the P-type field-effect semiconductor device 30e are complementary. Similarly, the N-type field-effect semiconductor device 10f and the P-type field-effect semiconductor device 30f are complementary.

In the operation of the NOR logic circuit 70, an input signal D is transmitted to the gates 25d and 41d of the complementary semiconductor devices 10d and 30d. Likewise, an input signal E is fed to the gates 25e and 41e of the complementary semiconductor devices 10e and 30e. In a similar manner, an input signal F is impressed on the gates 25f and 41f of the complementary semiconductor devices 10f and 30f.

If any one or more of the input signals D, E and F is equal to +V, then the associated P-type field-effect semiconductor device or devices 30d–30f will not conduct and its or their complementary N-type field-effect semiconductor devices 10d–10f will conduct. As a result thereof, a negative potential will appear at the terminal Y'. The non-conducting field-effect semiconductor device or devices 10d–10f provide a high impedance and also provide the active load, respectively, for the complementary conducting field-effect semiconductor devices 30d–30f. Hence, if any one or more of the P-type semiconductor devices 30d–30f conducts, a positive output signal is produced at terminal Y'.

Illustrated in FIG. 8 is a semiconductor unitary structure 80, which comprises a plurality of semiconductor devices, such as N-type external insulated gate field-effect semiconductor device 81 and a complementary P-type insulated gate field-effect semiconductor device 82, which are integrally formed on a single chip or slice 83.

In the preferred embodiment the chip or body 83 is of silicon and is doped in a conventional manner with N-type impurities, such as antimony, arsenic or phosphorous. For producing the P-type field-effect semiconductor device 82, P-type diffused regions 84 and 85 are formed in the N-type silicon body 83 and extend to an upper surface 86 of the silicon chip 83. The P-type diffused regions 84 and 85 are formed in a conventional manner by diffusing a P-type impurity such as aluminum, boron or indium into the silicon body 83.

For producing the N-type field-effect semiconductor device 81, the silicon body 83 is doped in a conventional manner with P-type impurities, such as aluminum, boron or indium to form a P-type region 90 within the N-type silicon body 83. Formed in the P-type region 90 are N-type diffused regions 91 and 92, which extend to the upper surface 86 of the silicon body 83.

The N-type diffused regions 91 and 92 are formed in a conventional manner by diffusing antimony, arsenic or phosphorous into the P-type region 90. An insulated layer 95 preferably of silicon dioxide is thermally grown on the surface 86 of the silicon body 83 and is located in part between associated drain and source contacts. The drain contacts 87 and 93, as well as the source contacts 88 and 94, are metallized with a suitable metallic substance, such as aluminum. Source contact 93 also serves as the metal interconnection between P-type region 90 and N-type region 92.

A metallic gate 96 of preferably aluminum for the P-type field-effect semiconductor device 82 is disposed in contact with the portion of the insulated layer 95 located between the drain 87 and the gate 88. Similarly, a metallic gate 97 of preferably aluminum for the N-type field-effect semiconductor device 81 is disposed in contact with the portions of the insulated layer 95 located between the drain 93 and the source 94.

The P-type insulated gate field-effect semiconductor device 82 operates and functions in the manner previously described in detail for the P-type insulated gate field-effect semiconductor device 30. Likewise, the N-type external insulated gate field-effect semiconductor device 81 operates and functions in the manner previously described in detail for the N-type external insulated gate field-effect semiconductor device 10.

A lead 87a is attached to the source electrode 87 of the semiconductor device 82 and is connected to a source of electrical energy. Through this arrangement, a +V biasing potential is applied to the source electrode 87. In a like manner, a lead 93a is connected to the source electrode 93 of the semiconductor device 81 and is connected to the source of electrical energy. Through this arrangement, a −V biasing potential is impressed on the drain electrode 93. It is to be noted that all junctions will be either at zero bias or at reverse bias, but it will never be at forward bias. The gates 96 and 97 of the semiconductor devices 82 and 81, respectively, are connected in common over a conductor 100. Fed to the conductor 100 is an input signal V*i*. A common conducting strip 101 is attached to the source electrodes 88 and 94 of the semiconducting devices 82 and 81, respectively. A lead 102 is connected to the conducting strip 101 for transmitting the output signal therefrom.

From the foregoing, it is observed that an inverter circuit 81a is formed from the semiconductor unitary structure 80. The operation of the inverter or switching circuit 81a will now be described. When the input signal V*i*, which is impressed on the gates 96 and 97, is equal to or greater than the positive critical potential, the P-type field-effect semiconductor device 82 will not conduct and the N-type field-effect semiconductor device 81 will conduct. The output voltage V*o* is, therefore, negative.

When the input signal V*i*, which is impressed on the gates 96 and 97, is equal to or more negative than the critical potential, the N-type field-effect semiconductor device 81 will not conduct and the P-type field-effect semiconductor device 82 will conduct. The output voltage V*o* is positive.

Therefore, the circuit 81a produces a switching or inverting action without employing any passive load component, such as a load resistor. Further, the field-effect semiconductor device 82, a majority hole carrier device, is employed as the active load for the field-effect semiconductor device 81, a majority electron carrier device. The converse is also true, since the field-effect semiconductor device 82, a majority electron carrier device, is used as the active load for the field-effect semiconductor device 81, a majority hole carrier device.

The complementary N and P type insulated gate field-effect semiconductor devices are employed by the circuits of the present invention to produce low stand-by power systems. Through the exclusive use of these devices, the high speed switching circuits of the present invention dissipate appreciable power only during the switching transient. The above-described circuits of the present invention are relatively unaffected in performance by ambient temperatures up to approximately 150 degrees centigrade, since they employ only majority carrier devices which are relatively temperature-independent. Systems employing the circuits of the present invention perform in spite of large temperature gradients within the system.

Because of the voltage-controlled nature of the active elements, there are no problems of unequal sharing by the next logic stage, at least at low speeds. Thus, the fan out capabilities are extremely favorable. Further, the circuits of the present invention offer large voltage swings and low dynamic impedance in both states. This is desirable for immunity against noise pulses.

It is to be understood that modifications and variations of the embodiments of the invention disclosed herein may be resorted to without departing from the spirit of the invention and the scope of the appended claims.

Having thus described my invention, what I claim and desire to protect by Letters Patent is:

1. A combinational switching circuit comprising a first semiconductor body of one conductivity type with a plurality of spaced diffused regions of a conductivity type opposite to said body and forming PN junctions therewith extending to a surface of said body, a first pair of source and drain electrodes on said body adjacent two of said diffused regions at said surface, a first insulating layer on said surface of said body between said drain and source electrodes, a first gate electrode adjacent said first insulating layer, a pair of spaced diffused regions of said one conductivity type formed within a third one of said plurality of spaced diffused regions and forming PN junctions with said third diffused region extending to said surface, a second pair of source and drain electrodes on said pair of spaced diffused regions, a second insulating layer on the surface of said third diffused region between said second pair of source and drain electrodes, a second gate electrode on said second insulating layer, means for applying biasing potentials of the same polarity to both of said gate electrodes.

2. A circuit comprising a first insulated gate field-effect transistor having a substrate of one conductivity type, an insulating layer adjacent said substrate, a metal layer upon said insulating layer opposite said substrate, and a channel region adjacent said insulating layer having a conductivity type opposite said substrate upon application of a first predetermined bias voltage to said metal layer, thereby forming a PN junction between said substrate and said channel region, source and drain electrodes on opposite ends of said channel region, a second insulated gate field-effect transistor having a substrate of said opposite conductivity type, an insulating layer adjacent said substrate, a metal layer upon said insulating layer opposite said substrate, and a channel region adjacent said insulating layer having said one conductivity type upon application of a second predetermined bias voltage to said metal layer of polarity opposite to said first predetermined bias voltage, source and drain electrodes on opposite ends of said channel region, one of said source and drain electrodes of said first insulated gate field-effect transistor being coupled to one of said source and drain electrodes of said second insulated field-effect transistor, a means for applying a fixed bias voltage across the other of said source and drain electrodes of said first and second insulated field-effect transistors, and a means for applying a voltage signal of a single predetermined polarity to both of said metal layers of said first and second insulated gate field-effect transistors adapted to render said first insulated gate field-effect transistor conductive between its source and drain electrodes while rendering said second insulated gate field-effect transistor non-conductive between its source and drain electrodes, whereby said second non-conductive insulated gate field-effect transistor is employed as the active load for said first conductive insulated gate field-effect transistor.

3. The circuit of claim 2 further characterized by the channel region of each insulated gate field effect device being of the same conductivity type as the substrate of said insulated gate field effect device when there is no bias voltage applied to the metal layer of said insulated gate field effect device.

References Cited

UNITED STATES PATENTS

| | | | |
|---|---|---|---|
| 3,135,926 | 6/1964 | Bockemuehl | 330—38 |
| 3,201,574 | 8/1965 | Szekely. | |
| 3,213,299 | 10/1965 | Rogers | 307—88.5 |
| 3,215,859 | 11/1965 | Sorchych | 307—88.5 |
| 3,215,861 | 11/1965 | Sekely | 307—88.5 |
| 3,222,610 | 12/1965 | Evans et al. | 330—38 |

OTHER REFERENCES

REC Tech. Notes, No. 654, November 1965.

JAMES D. KALLAM, *Primary Examiner.*

JOHN W. HUCKERT, *Examiner.*

R. SANDLER, *Assistant Examiner.*